United States Patent
Dishman et al.

(10) Patent No.: US 6,246,498 B1
(45) Date of Patent: Jun. 12, 2001

(54) SYSTEM AND METHOD FOR FREE SPACE OPTICAL COMMUNICATIONS USING TIME DIVISION MULTIPLEXING OF DIGITAL COMMUNICATION SIGNALS

(75) Inventors: John F. Dishman, Palm Bay; Edward R. Beadle, Melbourne, both of FL (US)

(73) Assignee: Harris Corporation, Melbourne, FL (US)

(*) Notice: Subject to any disclaimer, the term of this patent is extended or adjusted under 35 U.S.C. 154(b) by 0 days.

(21) Appl. No.: 09/692,066

(22) Filed: Oct. 19, 2000

Related U.S. Application Data

(62) Division of application No. 09/076,494, filed on May 12, 1998.

(51) Int. Cl.⁷ ........................................................ H04J 4/00
(52) U.S. Cl. .................... 359/123; 359/172; 370/310; 370/478
(58) Field of Search .................................. 359/123, 124, 359/135, 172; 370/310, 478

(56) References Cited

U.S. PATENT DOCUMENTS

| | | | |
|---|---|---|---|
| 3,493,759 | 2/1970 | Adler | 250/199 |
| 3,689,841 | 9/1972 | Bello et al. | 329/39 |
| 4,074,234 | 2/1978 | Fox | 340/171 |
| 4,090,036 | 5/1978 | Stott et al. | 179/15 |
| 4,575,186 | 3/1986 | Gottlieb et al. | 350/358 |
| 4,579,421 | 4/1986 | Brown et al. | 350/162.12 |
| 4,628,493 | 12/1986 | Nelson et al. | 367/79 |
| 4,639,092 | 1/1987 | Gottlieb et al. | 350/372 |
| 4,671,620 | 6/1987 | Yao | 350/358 |
| 4,768,186 | 8/1988 | Bodell | 370/3 |
| 4,867,560 | 9/1989 | Kunitsugu | 356/152 |
| 4,960,322 | 10/1990 | Khoshnevisan et al. | 350/354 |
| 4,982,445 | 1/1991 | Grant et al. | 455/606 |
| 5,351,148 | 9/1994 | Maeda et al. | 359/124 |
| 5,410,421 | 4/1995 | Huignard et al. | 359/15 |
| 5,436,751 | 7/1995 | Ohya et al. | 359/182 |
| 5,450,223 | 9/1995 | Wagner et al. | 359/124 |
| 5,463,493 | 10/1995 | Shah | 359/312 |
| 5,528,582 * | 6/1996 | Bodeep et al. | 370/24 |
| 5,610,748 | 3/1997 | Sakanaka et al. | 359/154 |
| 5,682,256 | 10/1997 | Motley et al. | 359/117 |
| 5,689,354 | 11/1997 | Orino | 359/172 |
| 5,829,211 | 4/1999 | Watanabe | 359/124 |
| 5,896,211 * | 4/1999 | Watanabe | 359/124 |
| 6,009,084 * | 12/1999 | Beierle et al. | 370/478 |

* cited by examiner

*Primary Examiner*—Kinfe-Michael Negash
(74) *Attorney, Agent, or Firm*—Allen, Dyer, Doppelt, Milbrath & Gilchrist, P.A.

(57) ABSTRACT

A method and system of communicating in free space using an optical communication system, such as for intersatellite and satellite-to-ground communications, is disclosed. Digital communication signals are multiplexed with a plurality of other analog communication signals into a single broad band frequency division multiplexed signal. A laser generates an optical carrier and an electro-optic modulator modulates the optical carrier signal with the frequency division multiplexed signal to produce a phase modulated optical communications signal. A receiver is positioned, such as in a satellite, to receive the phase modulated optical communications signal. The receiver includes a demodulator for demodulating the phase modulated optical communication system back into the broad band frequency division multiplexed signal and a demultiplexer for demultiplexing the broad band frequency division multiplexed signal into the plurality of communication signals. The portion of those signals that were previously digital data can be demodulated back into the digital communication signals.

27 Claims, 4 Drawing Sheets

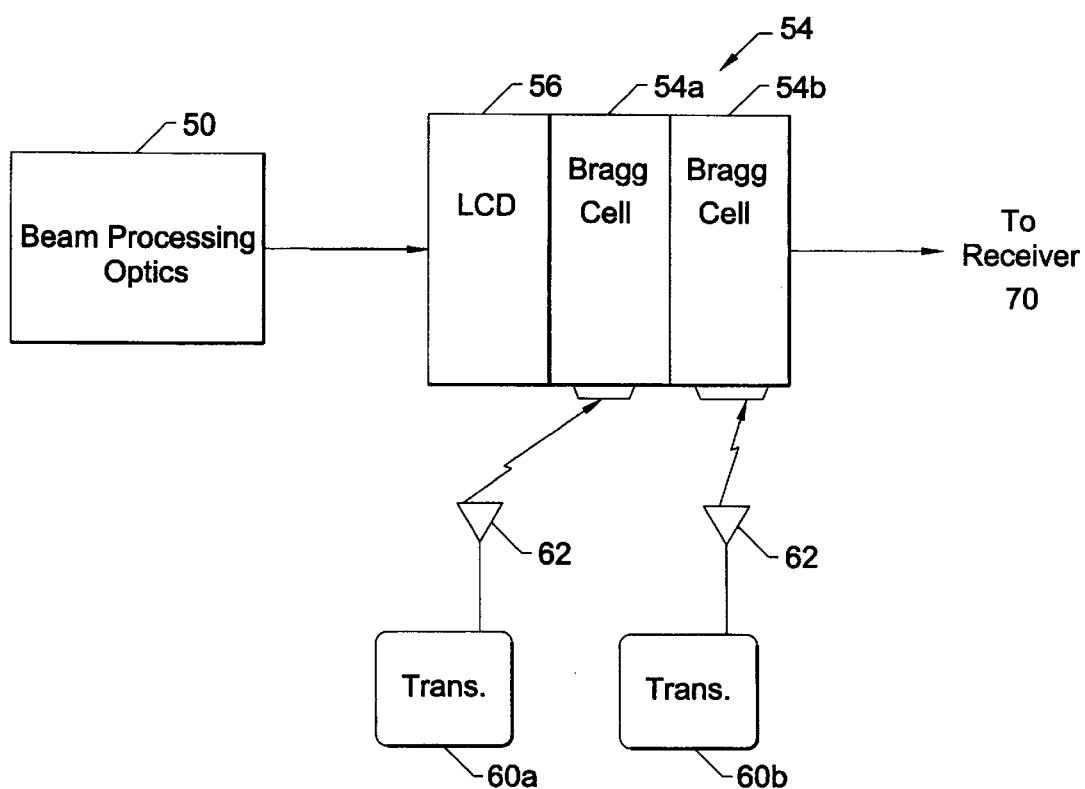

SYSTEM AND METHOD FOR FREE SPACE OPTICAL COMMUNICATIONS USING TIME DIVISION MULTIPLEXING OF DIGITAL COMMUNICATION SIGNALS

This application is a divisional of Ser. No. 09/076,494 filed on May 12, 1998, the disclosure of which is hereby incorporated by reference in its entirety.

FIELD OF THE INVENTION

This patent application is related to the field of optical communications, and more particularly, this patent application is related to optical intersatellite and satellite-to-ground communication systems.

BACKGROUND OF THE INVENTION

This invention describes a method by which next generation satellite communication systems can achieve extremely high data rates for direct intersatellite, satellite-to-ground, and ground-to-satellite communication over extremely large line-of-sight distances using optical technology. Traditionally, intersatellite links have been implemented in the microwave and millimeter wave regions. However, these options have limitations imposed by wavelength, transmit power, and modulation bandwidth. Optical data transmission overcomes these limitations. The small wavelength provides extremely high gains for the required transmit power for reliable communication at very large distances. In addition, the modulation bandwidths achievable for optical based channel are on the order of 20 Ghz and still rapidly increasing, where radio-frequency technologies are experiencing only incremental improvements. Such wide bandwidth provides a suitable channel for data communications exceeding 20 Gbps. However, current optical data communication technology is following the development of terrestrial fiber optic networks and concentrating solely on the transmission of digital information, typically using a pulse-pulse modulation (PPM) or on-off keying (OOK) format. Also common is the use of multiple optical wavelengths, called wavelength-division multiplexing (WDM), to increase the information rate in an optical channel. These techniques do not fully exploit the advantages of optical communication technology for high data rate space-based applications. There are several weaknesses to those approaches. For example, the PPM technique is not suitable for high data communications due to difficulties in detection and low bandwidth efficiency, and OOK is typically limited to applications that can use direct modulation of the laser. Also, WDM is not desirable, especially for space as multiple lasers are required as size, weight, power, cost and reliability are all degraded when adding multiple active components such as lasers.

The present invention circumvents all of the above shortcomings by electrically combining a number of data sources, digital or analog, using a frequency-division multiple access scheme, and using this signal as a wideband modulating signal to alter the phase of a single optical carrier. The constant envelope of phase modulation is advantageous as compared to amplitude modulations (OOK, PPM) for simplifying detection schemes as is well known in communications. At the receiving terminal, the carrier is coherently demodulated and the individual electrical signals recover using filtering and amplification. This invention, unlike known prior art, allows digital and analog signals to simultaneously share a single optical carrier.

Some prior art systems have used optical communication systems to an advantage. For example, U.S. Pat. No. 5,610,748 to Sakanaka et al. discloses a communications link having intensity modulation with a necessary pilot (e.g., auxiliary) signal. Intensity modulation is also more difficult in a system where the transmitter and receiver are moving relative to each other, such as with moving satellites. Also, the laser beam intensity changes with the distance between the transmitter and receiver, such as when satellites orbit, causing some data inconsistencies because the laser attenuation appears as a change in a data bit. Thus, intensity modulation is not as desirable as constant envelope modulation (i.e., phase modulation), for most free space communications. Although intensity modulation has been successfully used in some optical transmission systems, using a fiber system as disclosed in U.S. Pat. No. 5,351,148 to Maeda et al. However, it is desirable if another modulation besides intensity modulation were used for optical communications in free space. Additionally, because of the moving transmitter and receiver in intersatellite communication systems, more conventional mechanical steering elements are difficult to operate and it would be advantageous if a non-mechanical steering system could be used with such systems.

SUMMARY OF THE INVENTION

It is therefore an object of the present invention to provide a method and system of communicating in free space with intersatellite and satellite-to-ground communications that do not use intensity modulation or WDM of an optical carrier.

It is still another object of the present invention to provide a method and system of communicating in free space with an optical carrier signal produced by a laser that allows both analog and digital data to be sent simultaneously on the same optical carrier signal.

The present invention is advantageous because it now allows both analog and digital data to be transmitted simultaneously on a phase modulated optical communication signal to a receiver, such as for intersatellite and satellite-to-ground communications. Because the optical carrier signal is phase modulated, the problems associated with moving targets and changes in distances between the targets, e.g., satellites and/or ground stations and satellites, are reduced. The system and method of the present invention uses a constant envelope type of modulation, i.e., phase modulation, instead of the more conventional intensity modulation, which changes the amplitude of the signal. As a result, no auxiliary or pilot signal is necessary. Additionally, the phase modulated signal is readily adapted for non-mechanical steering which decreases any payload weight for communications equipment, requires less fuel and decreases acquisition times.

In accordance with the present invention, the system and method of the present invention allows communication in free space, such as in intersatellite communications, and includes a frequency division multiplexer for multiplexing a plurality of analog communication signals into a single broad band frequency division multiplexed signal.

Typically, a mixture of analog, digital or RF are each passed through a mixer where respective signals are up converted into a unique signal slot or channel. The frequencies then are combined to form the broad band frequency division multiplexed signal. A laser generates an optical carrier signal. An electro-optic modulator phase modulates the optical carrier signal with the multiplexed signal to produce a phase modulated optical communication signal.

A receiver is positioned, such as in a satellite, to receive the phase modulated optical communications signal. The receiver comprises a demodulator for demodulating the phase modulated optical communications signal back into the original broad band frequency division multiplexed signal. A demultiplexer (e.g., filter) allows demultiplexing of the broad band frequency division multiplexed signal into the plurality of communication signals comprising the frequency division multiplexed signal.

In still another aspect of the present invention, a plurality of digital communication signals are generated and analog modulated onto an optical carrier using electro-optic technique. The electro-optic modulator can preferably comprise a Mach-Zender electro-optic modulator. An antenna can receive communication signals to be multiplexed with a receiver, such as in a satellite, and can be connected through the frequency division multiplexer for receiving analog communication signals generated by a remote source. The electro-optic modulator preferably generates an optical carrier signal wavelength of about 1,550 nm. This wavelength is preferable because erbium-doped fiber amplifiers can be used at this wavelength for amplifying the phase modulated optical communication signals.

The system further comprises a Bragg cell and a liquid crystal display that receives the phase modulated optical communication signal for non-mechanically steering the phase modulated optical communication signal. The system also comprises a beam spoiler that receives the phase modulated optical communication signal for increasing the beam divergence of the phase modulated optical communication signal during transmission.

In still another aspect of the present invention, a non-mechanical steering device includes a Bragg cell to provide coarse two-dimensional indexing and a liquid crystal display to provide fine indexing of the phase modulated optical communications signal. The Bragg cell can further comprise first and second Bragg cell members to provide the two-dimensional coarse steering. The first and second Bragg cell members are responsive to a radio frequency signal that changes the index of refraction and provides steering.

In a method aspect of the present invention, optical intersatellite and satellite-to-ground communication in free space is facilitated. The method comprises the step of frequency division multiplexing a plurality of communication signals into a single, broad band frequency division multiplexed signal. The method further comprises the step of generating with a laser an optical carrier signal and the step of phase modulating the optical carrier signal with the broad band frequency division multiplexed signal by mixing the multiplexed signal with the optical carrier signal in an electro-optic modulator to produce a phase modulated optical communication signal.

After phase modulation, the method further comprises the step of transmitting the phase modulated optical communications signal to a receiver where it is demodulated back into the broad band frequency division multiplexed signal and then demultiplexed into the plurality of communication signals.

With the present invention, the method can also include the step of generating a plurality of digital communication signals and modulating those signals into analog communication signals, also known as digital waveform, before frequency division multiplexing. These modulated digital communication signals can be up converted and then combined with other up converted analog communication signals into a single, broad band frequency division multiplexed signal.

In accordance with another aspect of the present invention, a beam steering device allows free space optical communications. The beam steering device includes a Bragg cell having first and second Bragg cell elements for providing two-dimensional indexing of the phase modulated optical communication system. The first and second Bragg cell elements are responsive to the input of a radio frequency control signal. A liquid crystal display also receives the phase modulated optical communication signal to provide fine steering.

BRIEF DESCRIPTION OF THE DRAWINGS

Other objects, features and advantages of the present invention will become apparent from the detailed description of the invention which follows, when considered in light of the accompanying drawings in which:

FIG. 2 is a schematic block diagram of a non-mechanical steering device of the present invention having a liquid crystal display and first and second Bragg cell elements.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous because it now provides a method and system of communicating in free space with an optical carrier signal that is a phase modulated carrier and is advantageous over intensity modulation. With the constant envelope type of phase modulation, no auxiliary or pilot signal generator or detector is required. Additionally, the distances that often change between ground stations and satellites and/or two satellites in space would not affect the modulated communication signal as compared to an intensity modulated communication signal where the distance changes could create inconsistencies in data transmittal because of attenuation. Although some prior art systems disclose frequency modulated optical communication systems, most of these prior art systems are directed to the use of optical carrier signals transmitted through fiber. The present invention also allows a non-mechanical steering device that is advantageous because fewer moving parts are required, which allows faster reaction rates.

Figure 1A:
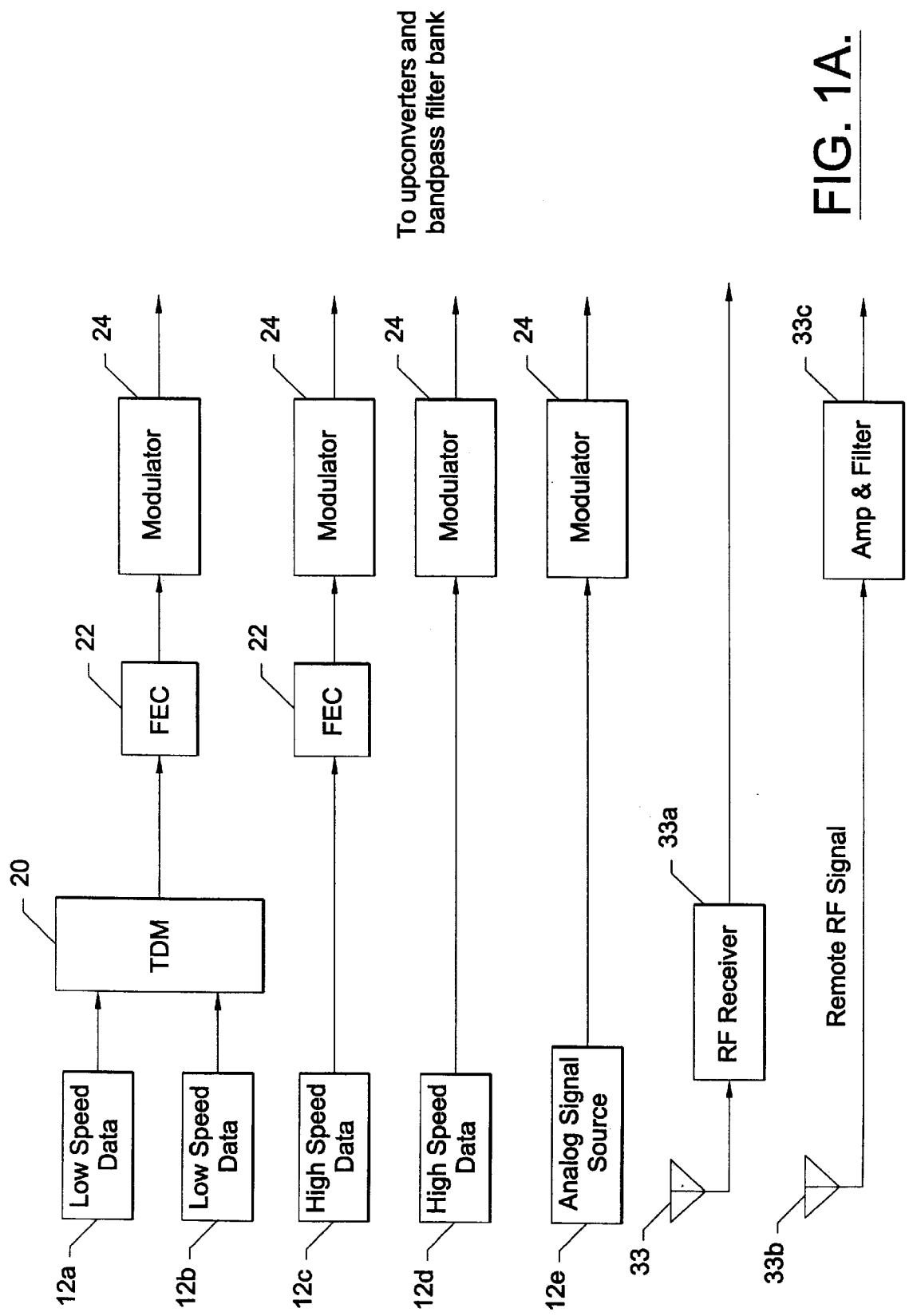
FIG. 1A is a schematic block diagram of the first half of the system of the present invention and showing band limited signal sources that are later combined.
Figure 1B:
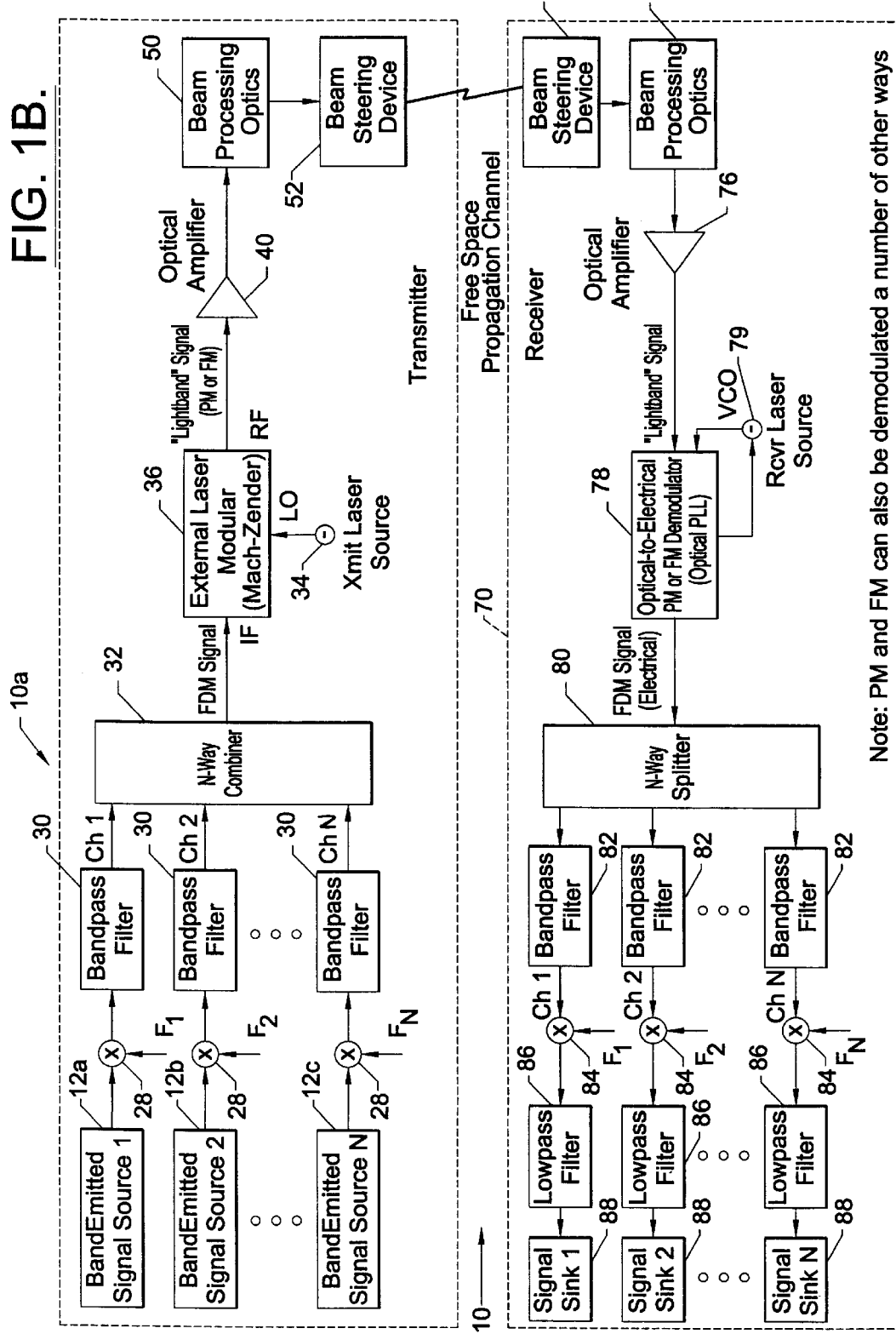
FIG. 1B is a schematic block diagram of the system of the present invention and showing the frequency division multiplexer and laser that generates an optical carrier signal and the beam steering devices.

Referring now to FIGS. 1A and 1B, there is illustrated at 10 the system of the present invention, which processes both digital and analog communication signals within a frequency division multiplexer and modulation unit indicated by the dotted line configuration at 10a. Thus, the present invention is advantageous because it allows both analog and digital communication signals to be transmitted along the same optical carrier through free space, such as in intersatellite communications.

For purposes of illustration, various examples of band limited signal sources are illustrated. Four digital data sources, an analog signal source, an RF receiver that receives analog signals and a remote amplifier and filter that receives other analog signals.

The sources of digital communication data 12a–d form an overall source or means for generating a plurality of digital communication signals. As illustrated, two of the data sources 12a and 12b are low speed data sources and communicate to a time division multiplexer 20 that receives the plurality of digital communication signals and multiplexes the digital communication signals into a plurality of time division multiplexed data streams. In the illustrated example, the two sources 12a and 12b can include many other sources (not illustrated) that are time division multiplexed. The digital data signals that are multiplexed are illustrated as low speed digital data channels (LSDC) and combined into moderate data rate time division multiplexed data streams.

For purposes of illustration, the process of frequency division multiplexing will be described relative to the low speed data sources 12a and 12b. The time division multiplexed data streams are then independently encoded using forward error correction (FEC) 22 and then pass through respective digital modulators 24 to produce a wave form of an analog signal as known to those skilled in the art. The modulated signals then enter the frequency division multiplexer (FIG. 1B), which includes respective mixers 28 that up converts each analog communication signal into a respective frequency slot or channel (shown as channels 1, 2 . . . N) at a typically higher frequency. This is accomplished through respective coding input to the mixers as illustrated by coding input lines indicated at $F_1$ through $F_m$. Those up converted frequencies then pass through a bank of band pass filters 30, and then into an N-way combiner 32 where the signals are combined into the frequency division multiplexed signal.

Depending on one skilled in the art, modulation choices can be selected depending on the design preferences. It is possible to have different codings, including concatenated codes and interweaving. A convolution code and a standard Reed-Solomon code could also be used adequately in the present invention for FEC. Any higher speed base band digital data channels (HSDC), such as from sources 12c and 12d, do not pass into the time division multiplexer because of impacts on spacecraft prime power and hardware overhead. Thus, these signals pass through the forward error correction 22 and are digitally modulated by modulators 24.

Analog signal source 12c passes through modulator 24, but not forward error correction. Other analog wave forms, such as received on an uplink, but not demodulated on-board, or other frequencies are multiplexed without passing through any forward error correction and modulators. These signals can be received in an antenna 33 of an RF receiver 33a, or pass into an antenna 33b and pass as a remote RF signal to an amplifier and filter 33c. All communication signals are subject to multiplexing as described before to produce a broad band frequency division multiplexed signal. The steps of multiplexing includes up converting each signal to a desired, unique frequency, then band pass filtering those up converted frequencies and combining the total up converted frequencies into a broad band frequency division multiplexed signal. The frequency division multiplexer can be made flexible by introducing dynamic channel and bandwidth allocations so that a laser producing the optical carrier signal will have a bandwidth that can be allocated "on-demand" by programming local oscillators and filters (not shown).

As shown in FIG. 1B, a transmit laser 34 generates an optical carrier signal. An electro-optic modulator 36 receives the broad band frequency division multiplexed signal and the laser generated optical carrier signal and phase modulates the optical carrier signal with the multiplexed signal to produce a phase modulated optical communication signal. As known to those skilled in the art in phase modulation, the instantaneous phase of the optical carrier signal is shifted in accordance with the modulating signal. In phase modulation, the extent of the phase shift is directly proportional to the amplitude of the modulating signal. The rapidity of the phase shift is directly proportional to both the amplitude and the frequency of the modulating signal, thus distinguishing phase modulation from frequency modulation where the result is a difference in the frequency-response characteristics.

The electro-optic modulator 36 of the present invention can comprise a Mach-Zender electro-optic modulator. This final up-conversion to "light band" as described is performed using the external analog modulation and power amplification techniques similarly used with continuous wave outputs of microwave transmissions. External modulation of the laser allows much wider modulation bandwidths than with direct laser diode modulation. Further, external modulation allows the laser diode to be selected without regard to the required modulation bandwidth using a Mach-Zender modulator and allow a very wide bandwidth (20 GHz). The laser requires low power and the Mach-Zender modulator can also implement frequency modulation besides the desired phase modulation.

After phase modulation, the phase modulated optical communication signal can pass through a sideband filter and then into erbium-doped fiber amplifier 40. The desired optical carrier signal produced by the laser 34 is about 1,550 nm to allow amplification of the phase modulated optical communication signal with erbium-doped fiber amplifiers.

The amplified signal then passes into beam processing optics 50 and through a beam steering device 52 of the present invention. As illustrated in FIG. 2, the beam steering device 52 includes a Bragg cell 54 formed from first and second Bragg cell elements 54a, 54b that provide for two-dimensional "coarse" steering or indexing followed by a liquid crystal display 56 that allows for fine indexing or steering of the phase modulated optical communication signal. The first and second Bragg cell elements 54b are connected to respective radio frequency sources that are highly stable, spectrally pure, local oscillators that are used for steering the optical communication signal from a ground station or via satellite.

As illustrated, a receiver 70 can be positioned in a satellite to receive the phase modulated optical communication signal. The receiver 70 includes a beam steering device 72 having a structure similar as in beam steering device 52. Beam steering device 72 receives the signal and then passes the signal to beam processing optics 74 and optical amplifier 76. The signal passes to an optical-to-electrical PM or FM demodulator 78 (i.e., optical phase locked loop demodulator) that receives VCO from receiver laser source 79. The signal passes to N-way splitter 80. The individual channels from the N-way splitter that correspond to each signal pass through band pass filters 82 and respective mixers 84 that are subject to coded sequences $F_1$ through $F_M$. The individual signals after demixing pass through low pass filter 86 and form the signal sinks 1–N 88 as illustrated. Because phase locked loop detection can be used, the Doppler shift induced by the relative motion of two communication platforms, such as in intersatellite communication systems, can be compensated.

After phase locked loop demodulation, as described above, the broad band frequency division multiplexed signal passes through the N-way splitter 80 where the various channels are separated in the basic reverse sequences of steps as described in the modulating and frequency multiplexing steps. The individual receiver would also maintain the bit and frame synchronization for proper decoding of the data streams. Naturally, appropriate circuitry can act as a digital demodulator for producing original digital data streams.

Figure 3:
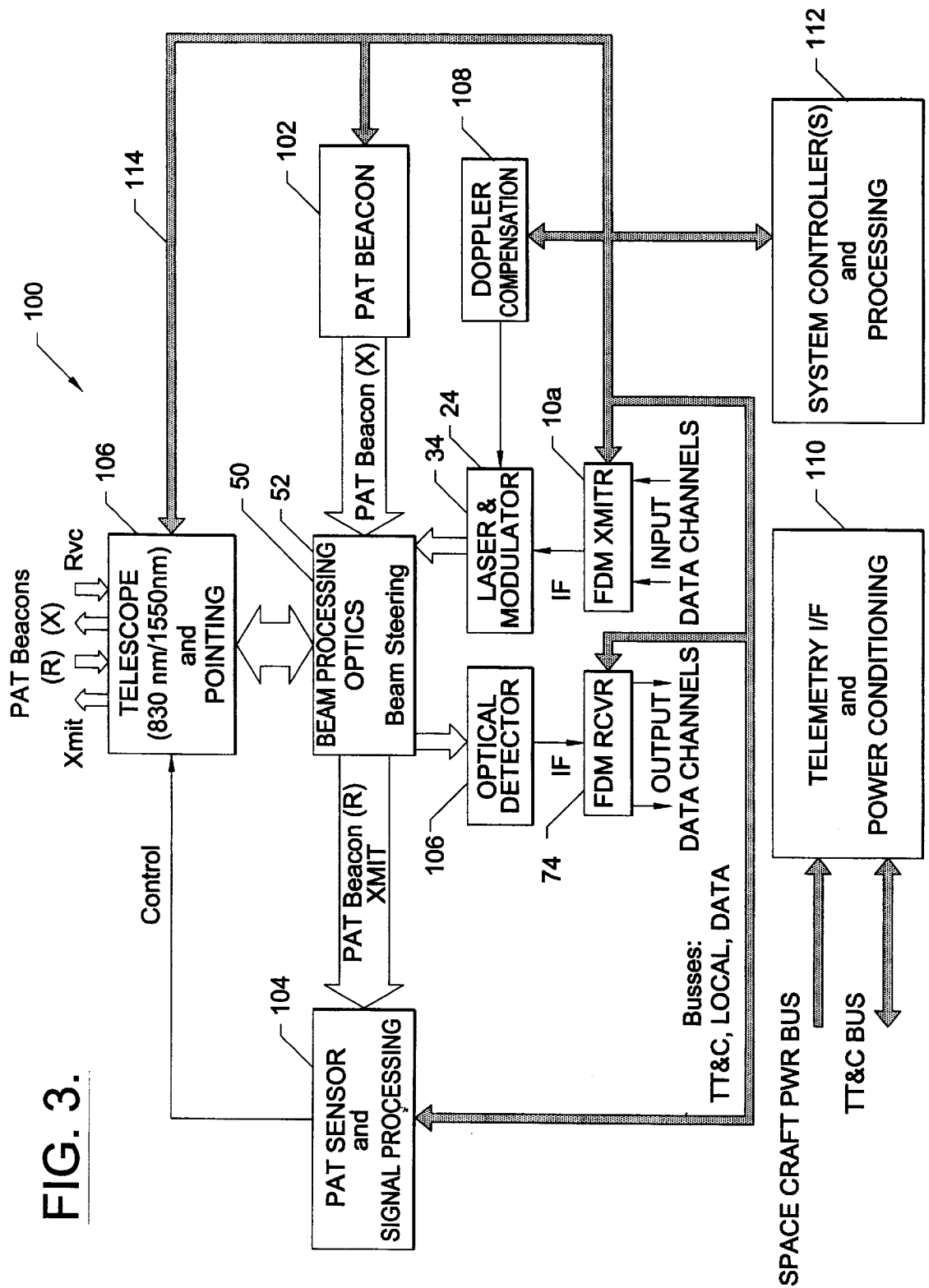
FIG. 3 is an overall schematic block diagram of functional elements used in the system of the present invention.

FIG. 3 illustrates a high level block diagram of a laser communications terminal indicated at 100, which can be used such as in a satellite. As noted, the optical carriers are generated by the laser for transmit and receive laser beams in the 1,550 nm band and offset by several nm to ease optical filtering. Point and tracking (PAT) beacons 102 for the laser 34 can use wavelengths less than one micrometer. All optical signals are envisioned to share the same telescope optics. The interfaces to the optical modulator and detector portions of the overall terminal are designed to mimic a typical microwave transmitter. Therefore, microwave links can be upgraded transparently. The laser beam 34 is typically a semiconductor laser diode and chosen for wavelength considerations. The beam processing optics is a collection of filters, splitter/combiners, lenses and collimators that are used to deliver coherent beams to proper destinations as known to those skilled in the art.

The point and tracking sensor and signal processing circuit 104 are used for the initial acquisition and, if necessary, reacquisition in tracking of various transmit and receive laser beams for communication with another satellite or spacecraft. Special telescope pointing tracking beacon circuits 106 are used for optically establishing and maintaining optical alignment between two satellites or platforms. The non-mechanical steering device 52 of the present invention is used to mimic the usual mechanical devices found in some steering assemblies. The Bragg cell can also provide for beam spoiling where the beam divergence is intentionally increased to search the entire field of uncertainty (FOU) for a receiver located on another satellite. The usual approach is to perform a spiral scan of the field of uncertainty, which is time consuming and necessitates spacecraft attitude compensation.

The optical method of the present invention requires no compensation and the optical approach using the liquid crystal display and Bragg cell decreases the payload weight, requires less fuel, and dramatically decreases acquisition times. It also provides higher bandwidth controls to maintain pointing, which reduces burst errors. Other circuits that are known to those skilled in the art are the optical detector circuit 106, the frequency division multiplexer transmitter 10a, the receiver 70 having the frequency division demultiplexer, the telemetry I/F and power conditioning circuit 110, and the system controllers and processing circuits 112. An appropriate circuit bus 114 interconnects the various circuits.

The point-ahead angle for the laser beam can be calculated using a fast read-out focal plane CCD array and a two spot system. The point-ahead angle can be derived by computing the Euclidean distance between the centroids of a receive beacon and transmit signal. The data can be processed using a specialized read-out algorithm and dedicated digital signal processing hardware.

It is evident that the present invention is advantageous because it now allows both data and analog communication signals to be transmitted on an optical carrier signal through phase modulation. The drawbacks of intensity modulation are also overcome by the present invention. The non-mechanical steering device of the present invention also is advantageous to allow greater bandwidths and faster tracking times.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A method of communicating in free space comprising the steps of:
    generating a plurality of digital communication signals;
    time division multiplexing the digital communication signals into a plurality of time division multiplexed data streams;
    modulating the multiplexed data streams to produce a plurality of analog communication signals;
    frequency division multiplexing the plurality of communication signals into a single broad band frequency division multiplexed signal;
    generating with a laser an optical carrier signal;
    phase modulating the optical carrier signal with the broad band frequency division multiplexed signal by mixing the multiplexed signal with the optical carrier signal in an electro-optic modulator;
    transmitting the phase modulated optical communications signal to a receiver;
    demodulating the phase modulated optical communications signal back into the frequency division multiplexed signal;
    demultiplexing the frequency division multiplexed signal into the plurality of analog communication signals;
    demodulating the analog communication signals into the time division multiplexed data streams; and
    demultiplexing the data streams into the plurality of digital data streams.

2. A method according to claim 1, and further comprising the step of phase modulating the optical carrier signal by mixing the optical carrier signal and the broad band frequency division multiplexed signal within a Mach-Zender electro-optic modulator.

3. A method according to claim 1, and further comprising the steps of up converting each of the plurality of analog communication signals into a defined frequency slot, and combining the frequencies to create the frequency division multiplexed signal.

4. A method according to claim 1, and further comprising the step of non-mechanically steering the phase modulated optical communications signal by passing the communications signal through a Bragg cell and liquid crystal display.

5. A method according to claim 1, and further comprising the step of beam spoiling the phase modulated optical communications signal by increasing the beam convergence of the communications signal during transmission.

6. A method according to claim 1, and further comprising the step of demodulating the phase modulated optical communications signal by phase locked loop detection.

7. A system for communicating in free space comprising:
   means for generating a plurality of digital communications signals;
   a time division multiplexer that receives the plurality of digital communication signals and multiplexes the digital communications signals into a plurality of time division multiplexed data streams;
   a modulator for receiving and modulating the time division multiplexed data streams into a plurality of communication signals;
   means for multiplexing the plurality of broad band analog communication signals into a single broad band frequency division multiplexed signal;
   a laser for generating an optical carrier signal;
   an electro-optic modulator that receives said broad band frequency division multiplexed signal and said laser generated optical carrier and phase modulates the optical carrier signal with the multiplexed signal to produce a phase modulated optical communications signal;
   a receiver that receives the phase modulated optical communications signal, said receiver further comprising:
      a demodulator for demodulating the phase modulated optical communications signal back into the broad band frequency division multiplexed signal,
      a demultiplexer for demultiplexing the broad band frequency division multiplexed signal into the plurality of analog communication signals,
      means for demodulating the analog communications signals into the time division multiplexed data streams, and
      means for demultiplexing the data streams into the plurality of digital data streams.

8. A system according to claim 7, and wherein said electro-optic modulator further comprises a Mach-Zender electro-optic modulator.

9. A system according to claim 7, wherein said means for multiplexing further comprises a respective mixer for up converting respective analog signals into a defined frequency channel, and a combiner for combining the up converted frequencies into the frequency division multiplexed signal.

10. A system according to claim 7, and further comprising a Bragg cell and liquid crystal display that receive the phase modulated optical communications signal for non-mechanically steering the phase modulated optical communications signal.

11. A system according to claim 7, and further comprising a beam spoiler that receives the phase modulated optical communications signal for increasing the beam divergence of the phase modulated optical communications signal during transmission.

12. A system according to claim 7, and further comprising a heterodyne detector for demodulating the phase modulated optical communications signal.

13. A method of communicating in free space comprising the steps of:
   time division multiplexing a plurality of digital communication signals into a plurality of time division multiplexed data streams;
   modulating the multiplexed data streams to produce a plurality of analog communication signals;
   frequency division multiplexing the plurality of communication signals into a single broad band frequency division multiplexed signal;
   phase modulating an optical carrier signal with the broad band frequency division multiplexed signal by mixing the multiplexed signal with an optical carrier signal in an electro-optic modulator;
   demodulating within a receiver the phase modulated optical communications signal back into the frequency division multiplexed signal; and
   demultiplexing the frequency division multiplexed signal into the plurality of analog communication signals.

14. a method according to claim 13, and further comprising the steps of:
   demodulating the analog communication signals into the time division multiplexed data streams; and
   demultiplexing the data streams into the plurality of digital data streams.

15. A method according to claim 13, and further comprising the step of phase modulating the optical carrier signal by mixing the optical carrier signal and the broad band frequency division multiplexed signal within a Mach-Zender electro-optic modulator.

16. A method according to claim 13, and further comprising the steps of up converting each of the plurality of analog communication signals into a defined frequency slot, and combining the frequencies to create the frequency division multiplexed signal.

17. A method according to claim 13, and further comprising the step of non-mechanically steering the phase modulated optical communications signal by passing the communications signal through a Bragg cell and liquid crystal display.

18. A method according to claim 13, and further comprising the step of beam spoiling the phase modulated optical communications signal by increasing the beam convergence of the communications signal during transmission.

19. A method according to claim 13, and further comprising the step of demodulating the phase modulated optical communications signal by phase locked loop detection.

20. A system for communicating in free space comprising:
   a time division multiplexer for receiving a plurality of digital communication signals and multiplexing the digital communications signals into a plurality of time division multiplexed data streams;
   a modulator for receiving and modulating the time division multiplexed data streams into a plurality of analog communication signals;
   a multiplexer for multiplexing the plurality of broad band analog communication signals into a broad band frequency division multiplexed signal;
   an electro-optic modulator that receives said broad band frequency division multiplexed signal and an optical carrier signal and phase modulates the optical carrier signal with the multiplexed signal to produce a phase modulated optical communications signal;
   a demodulator for demodulating the phase modulated optical communications signal back into the broad band frequency division multiplexed signal; and
   a demultiplexer for demultiplexing the broad band frequency division multiplexed signal into the plurality of analog communication signals.

21. A system according to claim 20, and further comprising a demodulator for demodulating the analog communications signals into the time division multiplexed data streams.

22. A system according to claim 21, and further comprising a demultiplexer for demultiplexing the data streams into the plurality of digital data streams.

23. A system according to claim 20, and wherein said electro-optic modulator further comprises a Mach-Zender electro-optic modulator.

24. A system according to claim 20, and further comprising a mixer for up converting analog signals into a defined frequency channel, and a combiner for combining the up converted frequencies into the frequency division multiplexed signal.

25. A system according to claim 20, and further comprising a Bragg cell and liquid crystal display that receive the phase modulated optical communications signal for non-mechanically steering the phase modulated optical communications signal.

26. A system according to claim 20, and further comprising a beam spoiler that receives the phase modulated optical communications signal for increasing the beam divergence of the phase modulated optical communications signal during transmission.

27. A system according to claim 20, and further comprising a heterodyne detector for demodulating the phase modulated optical communications signal.

* * * * *